(12) United States Patent
Zhan et al.

(10) Patent No.: US 6,767,169 B2
(45) Date of Patent: Jul. 27, 2004

(54) CARGO SNUGGER STRAP AND HOOK MECHANISM

(75) Inventors: Mark Y. Zhan, Frankfort, IL (US); Stuart H. Thomson, Downers Grove, IL (US)

(73) Assignee: Holland L.P., Crete, IL (US)

(*) Notice: Subject to any disclaimer, the term of this patent is extended or adjusted under 35 U.S.C. 154(b) by 0 days.

(21) Appl. No.: 10/092,099

(22) Filed: Mar. 6, 2002

(65) Prior Publication Data

US 2002/0090275 A1 Jul. 11, 2002

Related U.S. Application Data

(62) Division of application No. 09/459,545, filed on Dec. 13, 1999, now Pat. No. 6,422,794.
(60) Provisional application No. 60/112,441, filed on Dec. 16, 1998.

(51) Int. Cl.[7] .................................................. B60P 7/08
(52) U.S. Cl. ....................... 410/100; 410/97; 410/116; 410/42; 410/103
(58) Field of Search ............................ 410/96, 97, 100, 410/116, 117, 42, 47, 12, 103; 248/499; 24/68 CD, 69 ST, 69 CT, 307, 265 CD

(56) References Cited

U.S. PATENT DOCUMENTS

| | | | | |
|---|---|---|---|---|
| 2,051,381 A | * | 9/1936 | Kiver ........................ 410/114 |
| 2,269,286 A | * | 1/1942 | Olt ............................. 410/97 |
| 3,161,149 A | * | 12/1964 | Monus ...................... 410/116 |
| 3,224,385 A | * | 12/1965 | Elsner | |
| 3,429,537 A | * | 2/1969 | Jantzen | |
| 3,837,048 A | * | 9/1974 | Louis et al. | |
| 4,823,443 A | * | 4/1989 | Waters | |
| 5,063,641 A | * | 11/1991 | Chuan | |
| 5,423,644 A | * | 6/1995 | First, Sr. .................... 410/100 |
| 5,800,106 A | * | 9/1998 | Miller ....................... 410/117 |
| 5,967,720 A | * | 10/1999 | Profit ........................ 410/116 |
| 6,030,158 A | * | 2/2000 | Tatina et al. ............... 410/100 |
| 6,152,664 A | * | 11/2000 | Dew et al. ................. 410/100 |
| 6,394,720 B1 | * | 5/2002 | McCay ...................... 410/100 |
| 6,402,446 B1 | * | 6/2002 | Nadherny et al. ......... 410/100 |
| 6,422,794 B1 | * | 7/2002 | Zhan et al. ................ 410/100 |

* cited by examiner

Primary Examiner—Stephen Gordon
(74) Attorney, Agent, or Firm—Barnes & Thornburg LLC; David C. Brezina; Mark J. Nahnsen

(57) ABSTRACT

An anchor with an "L" shaped aperture receives a strap pin end, the lower leg of the "L" locking the pin in place, the strap bearing on a smoothly curved side wall, the pin being held in place when not under load by a clip member on the back of the anchor and being contained within a pocket in the wall of a railroad box freight car. A two part strap is shortened to fit the cargo load through the use of a combination of turns and bights around a three part clip having a generally oval ring with an upstanding half oval ring portion displacing the various parts of the strap threaded thereon to increase friction.

4 Claims, 5 Drawing Sheets

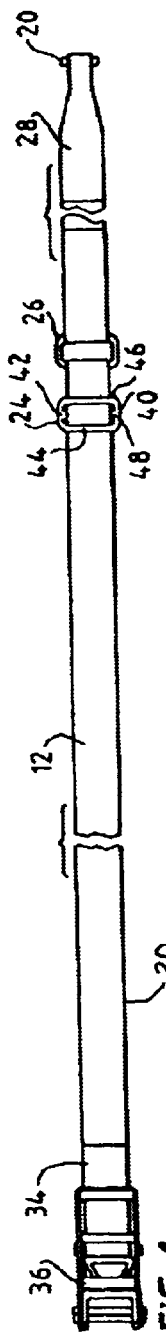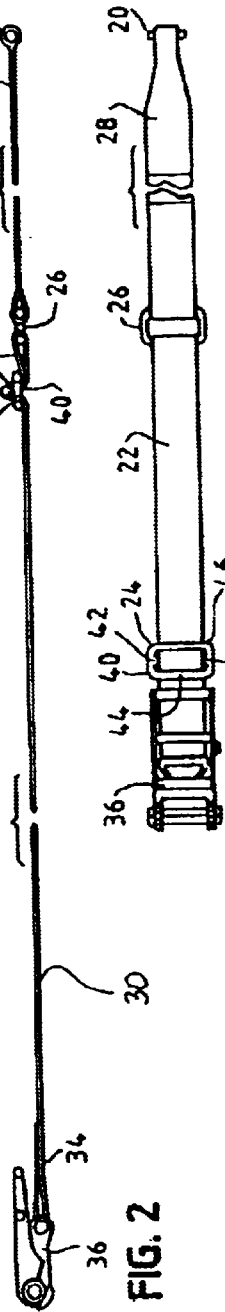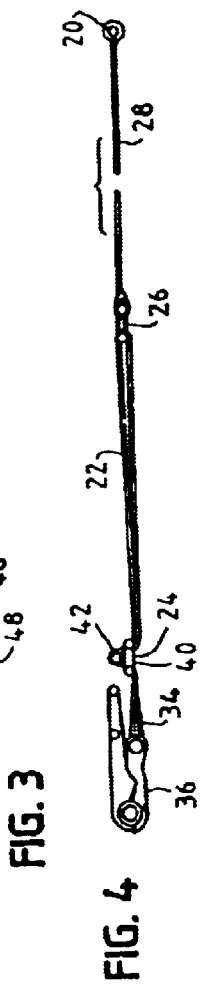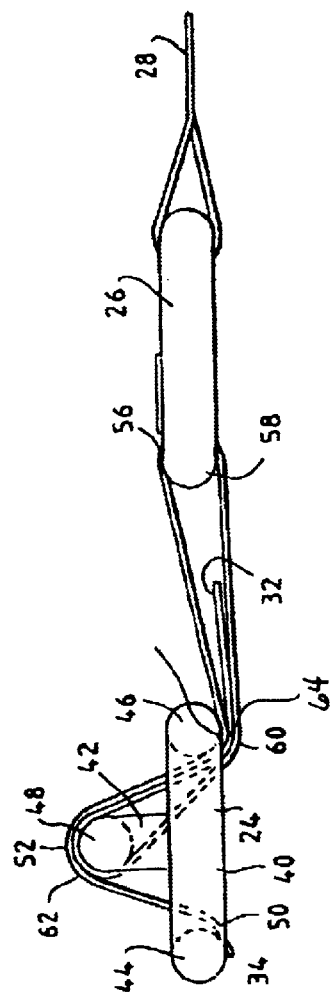
FIG. 1
FIG. 2
FIG. 3
FIG. 4
FIG. 5

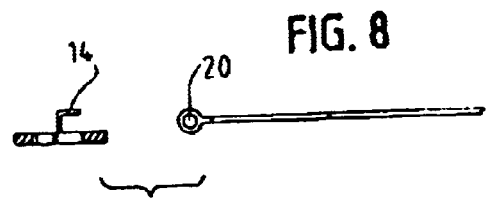
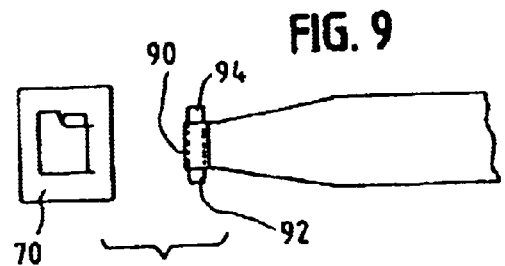
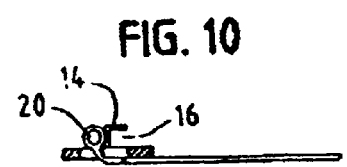
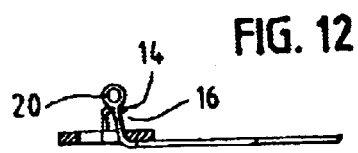
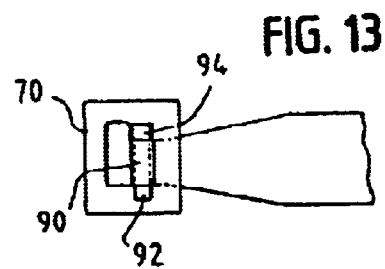
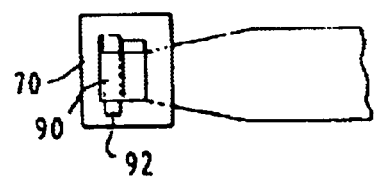
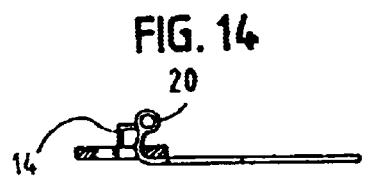
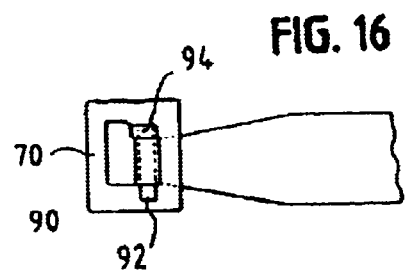
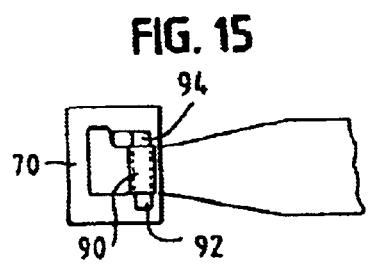
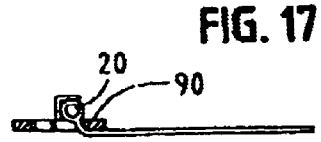

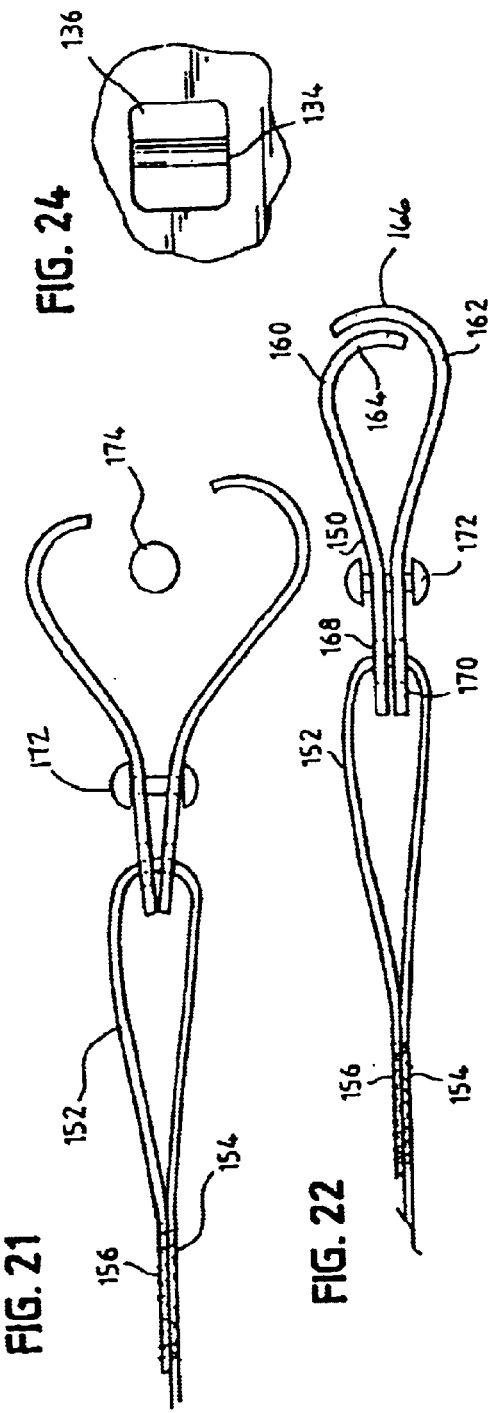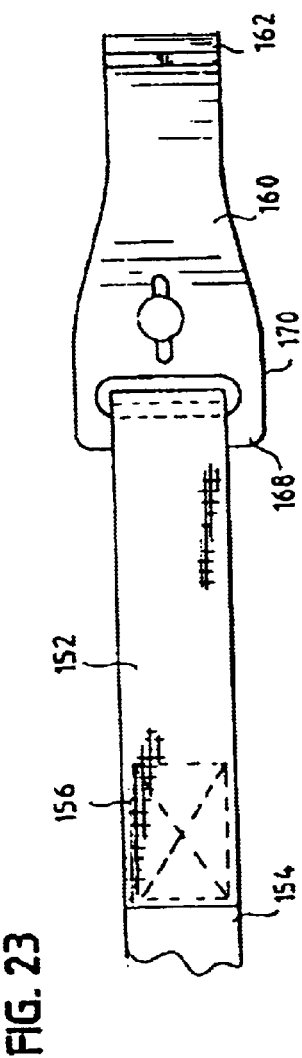
FIG. 21  FIG. 22  FIG. 23  FIG. 24

CARGO SNUGGER STRAP AND HOOK MECHANISM

CLAIM OF PRIORITY

This application is a divisional application based in Ser. No. 09/459,545 filed Dec. 13, 1999, which is now issued U.S. Pat. No. 6,422,794, and which claims the benefit of provisional application 60/112,441 filed Dec. 16, 1998.

BACKGROUND OF THE INVENTION

Loads on rail cars need to be restrained from shifting under the various loads imposed by draft, buff, and rocking of the car. For particular types of loads, such as large rolls or coils of sheet material, or palletized loads, tensioning mechanisms using straps and anchors are advantageous. A special anchor fitting adapted to receive a corresponding anchor pin combines with a strap length controlling mechanism midway from the ends of a strap to maximize strength, ease of operation, economy in manufacture and minimize damage to rolls, coils or palletized cargo. A simple cam locking mechanism may be used instead of the prior art metal ratchet mechanism on a strap.

The invention was initially adapted to shipment of paper rolls and other rolls of material easily damages by prior art rail car wall anchors. Other cargos can be secured to advantages, particularly palletized cargo such as shrink wrapped, packaged juices, or other similarly vulnerable cargo that should be protected from contact with in-car projections during loading, transporting and unloading. Further, appropriately sized snugger straps and hooks could even be used for other materials. In other uses, other transportation devices such as over the road trailers and shipping containers continue to utilize maximum cubic volume ("high cube") designs the ability to recess anchors also has added utility.

SUMMARY OF THE INVENTION

The invention combines several distinct elements into an improved cargo snugger strap and hook mechanism. An anchor has an "L" shaped aperture which A strap shortening device enables a two part strap to be shortened to fit the cargo load through the use of a combination of turns and bights around a three part clip having a generally oval ring with an upstanding half-oval ring portion displacing the various parts of the strap threaded thereon to increase friction to the point where the strap length can be effectively fixed under load, yet the length varied when not under load.

BRIEF DESCRIPTION OF THE DRAWINGS

FIG. 1 is an elevational view of my cargo snugger strap;

FIG. 2 is a plan view of my cargo snugger strap;

FIG. 3 is a an elevational view of my cargo snugger strap in an adjusted condition;

FIG. 4 is a plan view of my cargo snugger strap in an adjusted condition;

FIG. 5 is an enlargement of the adjustment mechanism;

FIG. 8 is a plan view of the strap and anchor during the step of aligning the pin with the anchor;

FIG. 9 is an elevational view of the strap and anchor during the step of aligning the pin with the anchor;

FIG. 10 is a plan view of the strap and anchor during the step of inserting the pin in the anchor;

FIG. 11 is an elevational view of the strap and anchor during the step of inserting the pin in the anchor;

FIG. 12 is a plan view of the strap and anchor during the step of moving the pin inwardly past the locking angle of the anchor;

FIG. 13 is an elevational view of the strap and anchor during the step of moving the pin inwardly past the locking angle of the anchor;

FIG. 14 is a plan view of the strap and anchor during the step of moving the pin forwardly past the locking angle of the anchor;

FIG. 15 is an elevational view of the strap and anchor during the step of moving the pin forwardly past the locking angle of the anchor;

FIG. 16 is a plan view of the strap and anchor during the step of engaging the pin with the locking angle of the anchor;

FIG. 17 is an elevational view of the strap and anchor during the step of engaging the pin with the locking angle of the anchor;

FIG. 21 is a top plan view of a hook;

FIG. 22 is a top plan view of a hook;

FIG. 23 is an elevational view of a hook; and

FIG. 24 is an elevational view of a rod anchor in a wall pocket.

DETAILED DESCRIPTION OF THE PREFERRED EMBODIMENT

Figure 6:
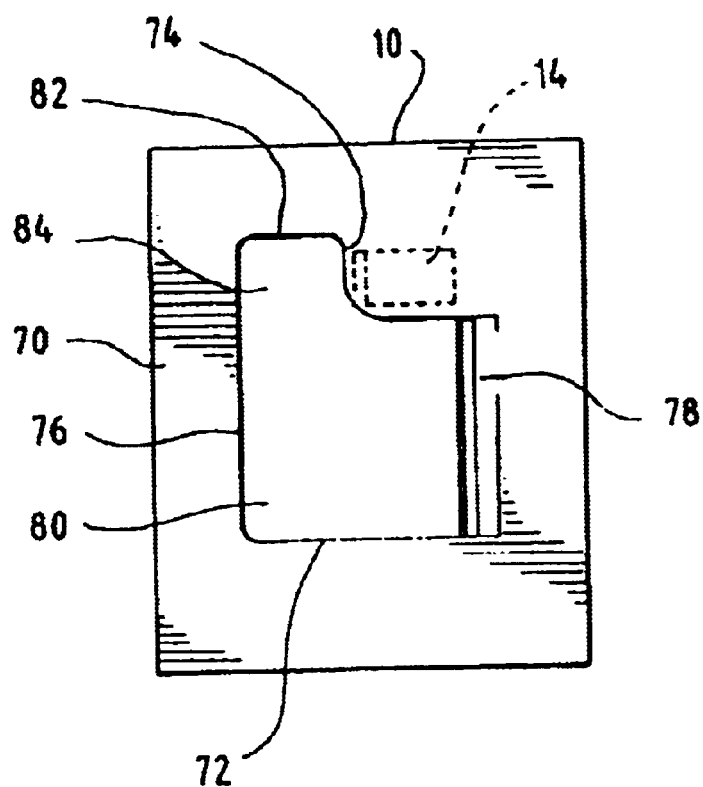
FIG. 6 is an elevational view of the anchor plate.
Figure 7:
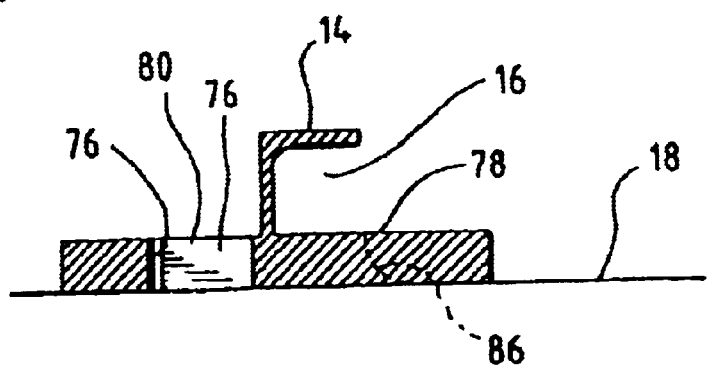
FIG. 7 is a sectional view of the anchor plate.

An improved wall anchor 10 is adapted for use in connection with a paper load snugger strap 12 for use in a transport vehicle such as a railroad freight box car. The wall anchor 10 includes a locking angle or clip member 14 recessed in a recess 16 in anchor 10 and also within car wall 18. In operation strap pin 20 will be inserted into the wall anchor 10 and manipulated into a secure position maintained by locking angle or clip member 14 which defines a recess 16 which captures an end of pin 20. After the strap 12 is tensioned, the strap pin 20 will be bear on anchor 10 itself firmly affixed to wall 18, there being a hollow, pocket or recess in the side of the car behind wall 18. The major advantage of this system is that under all circumstances there will be no object projecting inwardly into the cargo area of the car from the side wall 18 of the car to damage the cargo. This is particularly advantageous with easily damaged, but otherwise unpacked or uncrated cargo such as is the case with paper rolls or palletized, plastic wrapped cargo.

The anchor 10 and strap pin 20 work most advantageously with a strap-shortening device, generally designated 22, for cargo load snugger 12. The strap-shortening device 22 includes a specially designed clip 24. Clip 24 is preferably made from ⅝" dia. heat treated alloy steel. Steel ring 26 is similarly constructed of similar materials and dimensions. The clip 24 and ring 26 are thus capable to handle a minimum of 21,000 lbs. pulling force.

The shortening device 22 is formed and arranged as described below from two (2) pieces of preferably 4" polyester strap webs the pin side web 28 and the standing web 30 which are interconnected using clip 24 and ring 26. The term web is used in the general sense of describing a length of generally flat material, and is not necessarily limited to woven fibrous material, although such material is preferred. The concept can be applied to different sized straps or straps of different strength properties depends on the loads to be borne. Webs 28, 30 are specially routed through clip 24 and ring 26. The pin side web 28 is sewn to ring 26 at the end opposite strap pin 20. The standing web 30 passes through the various segments of clip 24 through a plurality of overlapping turns and bights that apply sufficient friction under load that the cargo is maintained in position in the rail car. Standing web 30 has working end 32 which is the end that passes though clip 24, while has standing end 34 is opposite. Standing end 34 is attached to a known tensioning device 36, typically a device with a ratchet or an over center cam arrangement to put final tension on strap 12 to bind the load, once excess length has been taken up by shortening device 22.

By feeding and pulling end 32 of web 30 through clip 24, the overall length of the strap 12 can be adjusted. The ratio of the adjustable length is almost 2:1 between the clip 24 and the steel ring 26. In other words, if a maximum 12' long strap system combined with that 6' long fixed strap from the wall anchor to steel ring and that a maximum 6' long adjustable strap between the clip and the steel ring, the system can be shortened to any length between 12' and 9' by using this device.

Clip 24 is formed so as to have a generally oval ring portion 40 and an upstanding half-oval portion 42. Each portion includes straight legs 44, 46, 48 integrally formed as part of their oval shapes. These legs provide a clear path for the webs with even distribution of loads and even application of friction. It will be seen that beginning from end 34 of web 30, end 32 will pass over the various legs 44, 46, 48 of clip 24 being threaded to the final form. Web 30, thus forms first turn 50 around leg 44, passes upwardly to leg 48 to form second turn 52, loosely held to enable subsequent threading. Web 30 then passes downwardly to leg 46 forming third turn 54. Web 30 then exits clip 24 and forms first bight 56 leading generally downwardly around a leg portion 58 of ring 26. Web 30 then passes back to clip 24, specifically forming fourth turn 60 around leg 46 and outward (below in FIG. 5) of third turn 54, but leaving a gap therebetween. Next, web 30 passes upwardly and around leg 48 to form second bight 62. This passes under turn 52 and will therefore be sandwiched between turn 52 and leg 48 when under load. End 32 then passes between turn 54 and turn 60, forming fifth turn 64. Turn 64 will also be sandwiched under load, between turns 54 and 60 and under leg 46. In this manner, web 30 can be easily threaded manually and easily adjusted when no load is placed on the strap 12. However the multiple turns and bights, and the sandwiching action in two turns, greatly increases the friction in the system when under load, thereby providing secure fastening of cargo. The turns, as shown in FIGS. 4 and 5, are generally between from about 35 degrees to about 130 degrees. The bights, as shown in FIGS. 4 and 5, are generally greater than 180 degrees.

FIGS. 8–17 illustrate the way pin strap 20 is anchored in anchor 10 through movement in three dimensions. Anchor 10 uses a plate or fitting 70 formed with bottom 72, top 74 and two side 76, 78 interior walls which define an aperture 80. The term plate is used for convenience and not by way of limitation to a particular method of fabricating, thus, cut and formed steel plate could be used, as could appropriate forgings, castings or moldings of appropriate material. Top wall 74 is formed to have recessed portion 82 which defines a notch 84 or enlarged portion of aperture 80. Side wall 78 is further formed so as to have a smoothly curved surface 86 to relieve stress on web 28 when under load.

As strap pin end 90 approaches aperture 80 because the length of pin 20 is greater than the distance from wall recess 82 to bottom wall 72, pin 20 will be tilted slightly to insert the lower pin end 92. As the width of the sewn end 90 is less than the width of the body of web 28, end 90 fits closely between the smaller dimension between wall 74 and wall 72. Thus, aperture 80 is generally of an "L" shape, the bottom leg of the "L" corresponding to the width of end 90, and the height of the "L" shape corresponding to slightly more than the width of end 90 plus the exposed top end 94 of pin 20.

FIGS. 10–17 show the progression of inserting pin 20 behind plate 70 and its movement around angle or clip member 14 until, as shown in FIGS. 16 and 17, it is in its final anchored position. It will be noted that strap 28 at end 92 bears on curved surface 86 in FIG. 17. Thus, the load across strap 12 is borne on anchor 10 when tensioned, while pin 20 is held in place when strap is untensioned, by angle or clip member 14. While in the preferred embodiment, a weldment of a right angle section steel member is utilized, other clip member configurations could be used to perform this function.

The anchor 10 in combination with strap shortening device 22 further enables elimination of the contact between the prior art metal ratchet (analogous to tensioning device 36) and the cargo loads such as paper loads or palletized cargo requiring surface protection. This prior art contact creates restrictions in the utility of prior art load snugger systems because of the damage to the cargo loads. The invention also could offers a better ratchet operating position for dock workers because of the improved location of tensioning device 36 relative to the ends of the strap 12.

Figure 18:
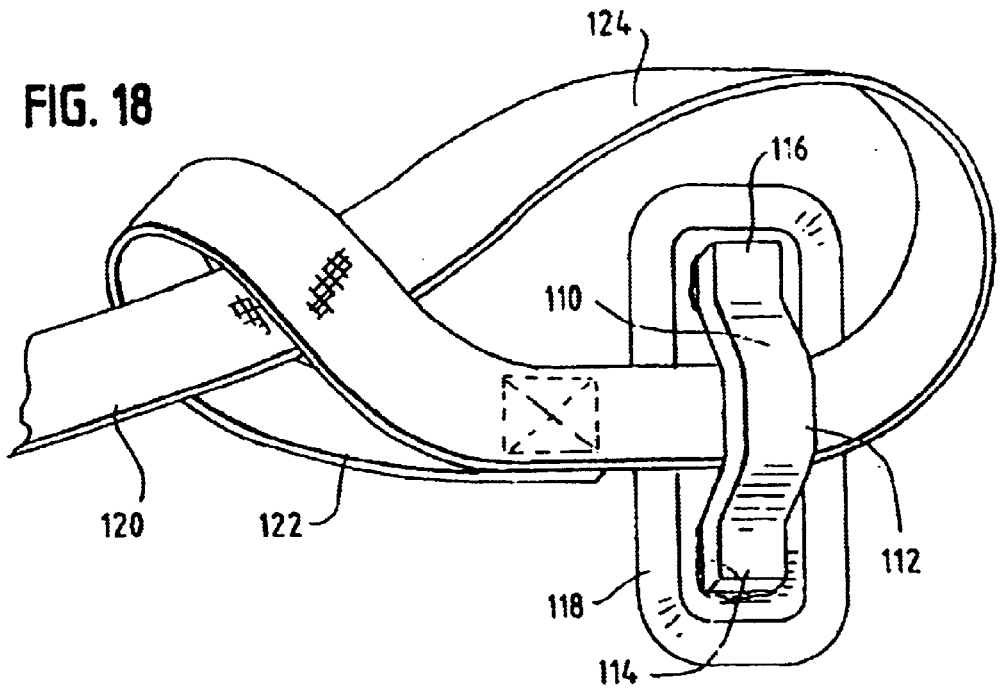
FIG. 18 is a perspective view of a preferred strap eye anchor with a choker strap.
Figure 19:
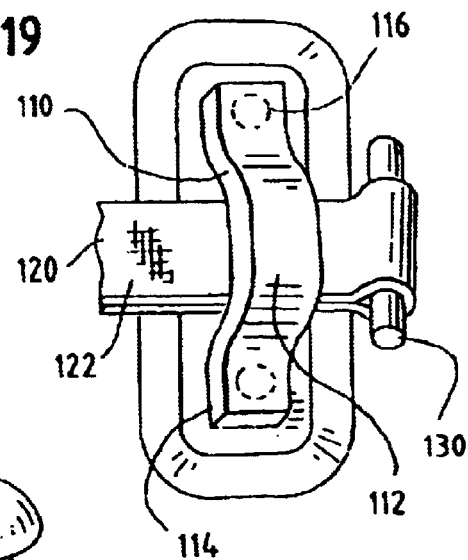
FIG. 19 is a perspective view of a strap eye anchor with a strap toggle.
Figure 20:
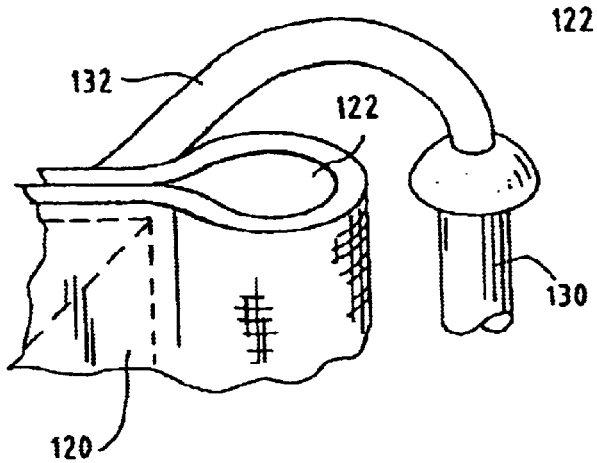
FIG. 20 is a perspective view of a toggle pin, strap and lanyard.

Alternative anchor attachments are shown in FIGS. 18–20. A strap eye 110 having center bail 112 and ends 114, 116, is mounted on a car wall 118. This can be easily accomplished by welding, preferred in the current field environment, or alternative attachments could be used, as by heavy duty bolts or rivets through ends 114, 116. A sufficiently wide footprint, using the ends 114, 116 and bail 112 as shown, enables the use of a "choker" arrangement where a strap 120 has a loop 122 such that the standing part 124 is passed through the loop for a tight, fastener-free connection to the eye 110. If a car is fitted with a recessed pocket, the function of bail 112 could be performed by a bar 134 spanning the pocket 136.

In another alternative, loop 122 is passed through eye 110, particularly where the standing part is fixed or it is inconvenient to set the choker arrangement, and pin 130 is inserted into loop 122, strap 120 being drawn in tension, such that a toggle connection is formed. In this arrangement, toggle pin 130 can be removed by hand upon slacking of strap 120. Lanyard 132 can be used to maintain pin 130 from being lost.

FIGS. 21–23 show an improved strap hook 150 that may be fastened to a looped end 152 of a strap 154. Preferably end 152 is stitched 156, however buckle arrangements known in the art or described above could perform a loop forming function. Stitching has advantages in durability and avoidance of misadjustment and slipping, particularly when at a bitter end of a strap 154.

Strap hook 150 is made up of inner plate 160 and an overlapping outer plate 162 having respective curved ends 164, 166. Opposite the curved ends 164, 166 of the inner and outer plates 160, 162 are slotted portions 168, 170, Plates 160, 162 are interconnected by a loosely fit rivet 172. The slotted portions 168, 170 are adapted to accept the end 152 of the strap 154. The combination of the flexibility of end 152 of the stray 154 and the loose fit arrangement of the end 152 of the strap hook 150 with slotted portions 168, 170 and the ability of the inner and outer plates 160, 162 to move with respect to rivet 172, the strap hook 150 can be opened to be connected to an appropriate pin 174 such as may be located on a strap shortening device 22 or anchor pocket bar 134, 136 (FIG. 24).

We claim:

1. A strap shortening device for securing cargo in a transport vehicle comprising:

a strap having a standing web, the standing web having a working end;

a clip having a ring with an upstanding half ring portion;

said end being threaded on said clip so as to have a combination of turns and bights, said clip displacing the various parts of the strap threaded therein to increase friction so that the strap length can be effectively fixed under load yet the length varied when not under load.

2. The strap shortening device of claim 1, further comprising:

said combination of turns and bights leading around said clip having said ring with said upstanding half ring portion displacing the various parts of the strap threaded thereon.

3. The strap shortening device of claim 2, further comprising:

said working end passes through said clip said strap having a standing end opposite said working end;

said standing end is attached to a tensioning device to put final tension on said strap to bind the cargo once excess length has been taken up by feeding and pulling said working end through said clip.

4. The strap shortening device of claim 3, further comprising:

the overall length of the strap being adjustable between said clip and said ring at a ration of about 2:1.

* * * * *